US012674870B2

(12) United States Patent
Peryev

(10) Patent No.: US 12,674,870 B2
(45) Date of Patent: Jul. 7, 2026

(54) LIDAR SYSTEMS AND METHODS

(71) Applicant: YANDEX SELF DRIVING GROUP LLC, Moscow (RU)

(72) Inventor: Yury Nikolaevich Peryev, d. Staryye Vysli (RU)

(73) Assignee: Y.E. Hub Armenia LLC, Yerevan (AM)

( * ) Notice: Subject to any disclaimer, the term of this patent is extended or adjusted under 35 U.S.C. 154(b) by 865 days.

(21) Appl. No.: 18/086,598

(22) Filed: Dec. 21, 2022

(65) Prior Publication Data

US 2023/0204729 A1 Jun. 29, 2023

(30) Foreign Application Priority Data

Dec. 28, 2021 (RU) ................................ 2021139322

(51) Int. Cl.
*G01S 7/481* (2006.01)
*G01S 17/89* (2020.01)
*G01S 17/931* (2020.01)

(52) U.S. Cl.
CPC .......... *G01S 7/4817* (2013.01); *G01S 7/4814* (2013.01); *G01S 17/89* (2013.01); *G01S 17/931* (2020.01)

(58) Field of Classification Search
CPC ...... G01S 7/4817; G01S 7/4814; G01S 17/89; G01S 17/931; G01S 17/42
See application file for complete search history.

(56) References Cited

U.S. PATENT DOCUMENTS 4,941,719 A     7/1990   Hisada et al.
5,071,239 A  *  12/1991  Hoffman ................ G02B 17/08
                                              359/728
(Continued)

FOREIGN PATENT DOCUMENTS

CN        108490419 A      9/2018
CN        111025266 A      4/2020
(Continued)

OTHER PUBLICATIONS

Thorlabs Small Optic Adapters (https://www.thorlabs.com/newgrouppage9.cfm?objectgroup_id=1433), Jul. 29, 2016 (Year: 2016).*

(Continued)

*Primary Examiner* — Isam A Alsomiri
*Assistant Examiner* — Benjamin Wade Clouser
(74) *Attorney, Agent, or Firm* — BCF LLP

(57) ABSTRACT

A LIDAR system including an emitter configured to emit at least one light beam; a detector configured for receiving light reflected from surrounding objects; and a rotatable scanning element including a reflective prism having at least four faces inclined relative to the axis of rotation, and a ring element having an interior edge face extending around in a plane orthogonal to the axis of rotation, the interior edge face having a variable angle varying from perpendicular to skewed relative to the axis of rotation, the emitter, the detector, and the rotatable scanning element being arranged such that the beam is incident on the interior edge face of the ring element and subsequently on one face of the at least four faces of the reflective prism, an angle of incidence of beam on the face depending on the variable angle of the ring element.

14 Claims, 10 Drawing Sheets

(56) References Cited

U.S. PATENT DOCUMENTS

| | | | | |
|---|---|---|---|---|
| 5,748,356 | A | 5/1998 | Park et al. | |
| 7,411,661 | B2 * | 8/2008 | Kim | G02B 5/09 |
| | | | | 356/4.01 |
| 2012/0257282 | A1 | 10/2012 | Hudman | |
| 2016/0306029 | A1 | 10/2016 | Lundquist et al. | |
| 2018/0284226 | A1 | 10/2018 | Lachapelle et al. | |
| 2018/0329038 | A1 | 11/2018 | Lin et al. | |
| 2019/0101627 | A1 | 4/2019 | Hansson et al. | |
| 2019/0154802 | A1 | 5/2019 | Campbell et al. | |
| 2019/0154804 | A1 | 5/2019 | Eichenholz | |
| 2019/0310351 | A1 | 10/2019 | Hughes et al. | |
| 2020/0174102 | A1 | 6/2020 | Asselin et al. | |
| 2020/0225328 | A1 * | 7/2020 | Mohr | G02B 5/045 |
| 2020/0350455 | A1 | 11/2020 | Gopal Krishnan et al. | |
| 2021/0124018 | A1 * | 4/2021 | Gassend | G01S 7/481 |
| 2022/0113406 | A1 * | 4/2022 | Cho | G01S 7/4817 |

FOREIGN PATENT DOCUMENTS

| | | | |
|---|---|---|---|
| DE | 19713826 | A1 | 10/1997 |
| EP | 3173816 | A2 | 5/2017 |
| KR | 20190020543 | A | 3/2019 |
| RU | 2745882 | C1 | 4/2021 |
| RU | 2752016 | C2 | 7/2021 |
| RU | 2762151 | C2 | 12/2021 |
| WO | 2018209073 | A1 | 11/2018 |

OTHER PUBLICATIONS

Russian Search Report dated Mar. 14, 2024 issued in respect of the related Russian Patent Application No. RU 2021139323.

European Search Report dated May 4, 2023 issued in respect of the European Patent Application No. 22216764.5.

Office Action issued on Sep. 5, 2024 in respect of the related U.S. Appl. No. 18/086,607.

Baier et al., "Novel refractive LiDAR sensor based on a variable lens pair prism", article published online on Mar. 23, 2019, vol. 2, issue 2, pp. 145-153, https://doi.org/10.1515/aot-2018-0054.

Pages from Anhu Li "Double-Prism Multi-Mode Scanning: Principles and Technology", published on Nov. 20, 2018.

* cited by examiner

Figure 6:
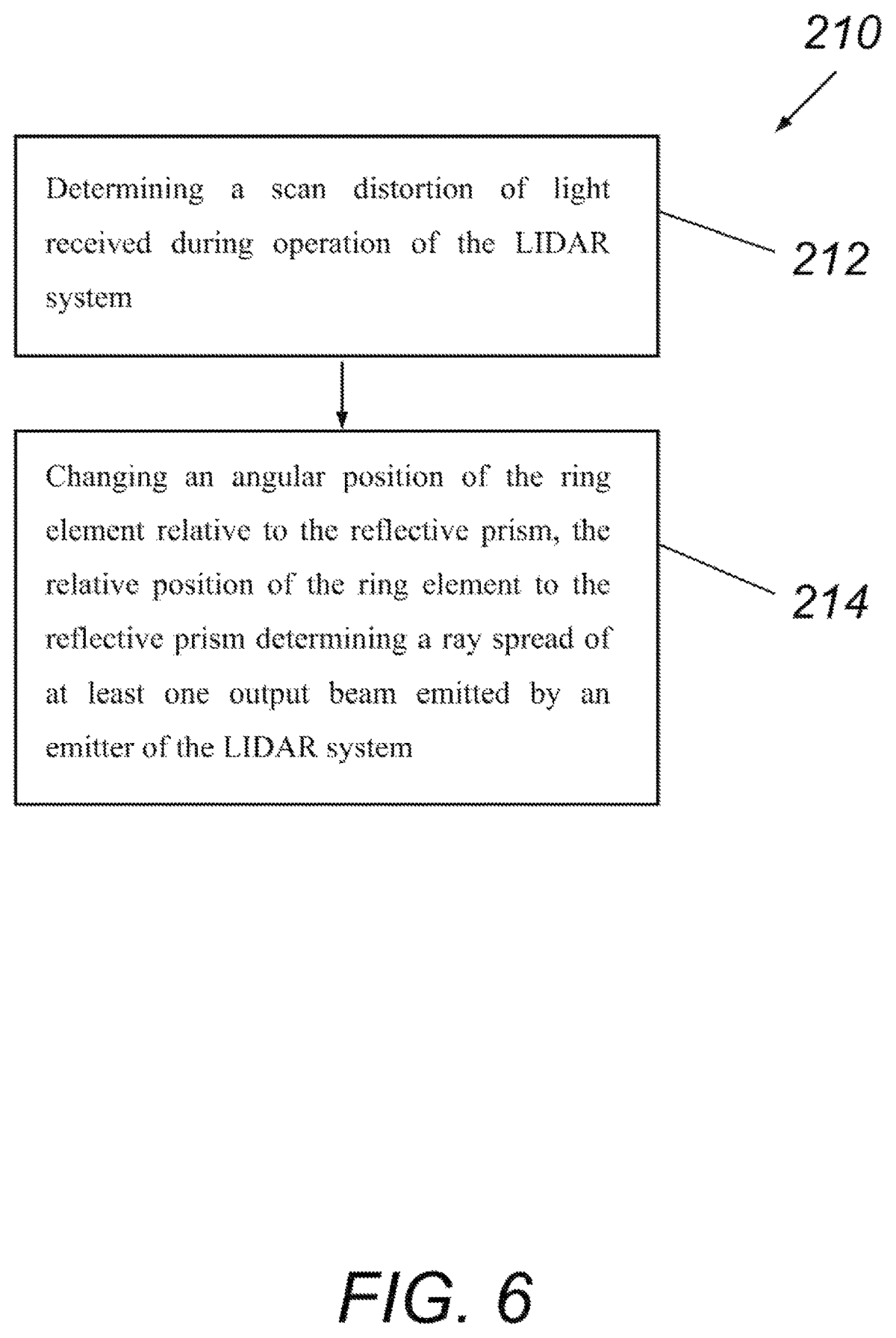

*210*

Determining a scan distortion of light received during operation of the LIDAR system

*212*

Changing an angular position of the ring element relative to the reflective prism, the relative position of the ring element to the reflective prism determining a ray spread of at least one output beam emitted by an emitter of the LIDAR system

Figure 10:
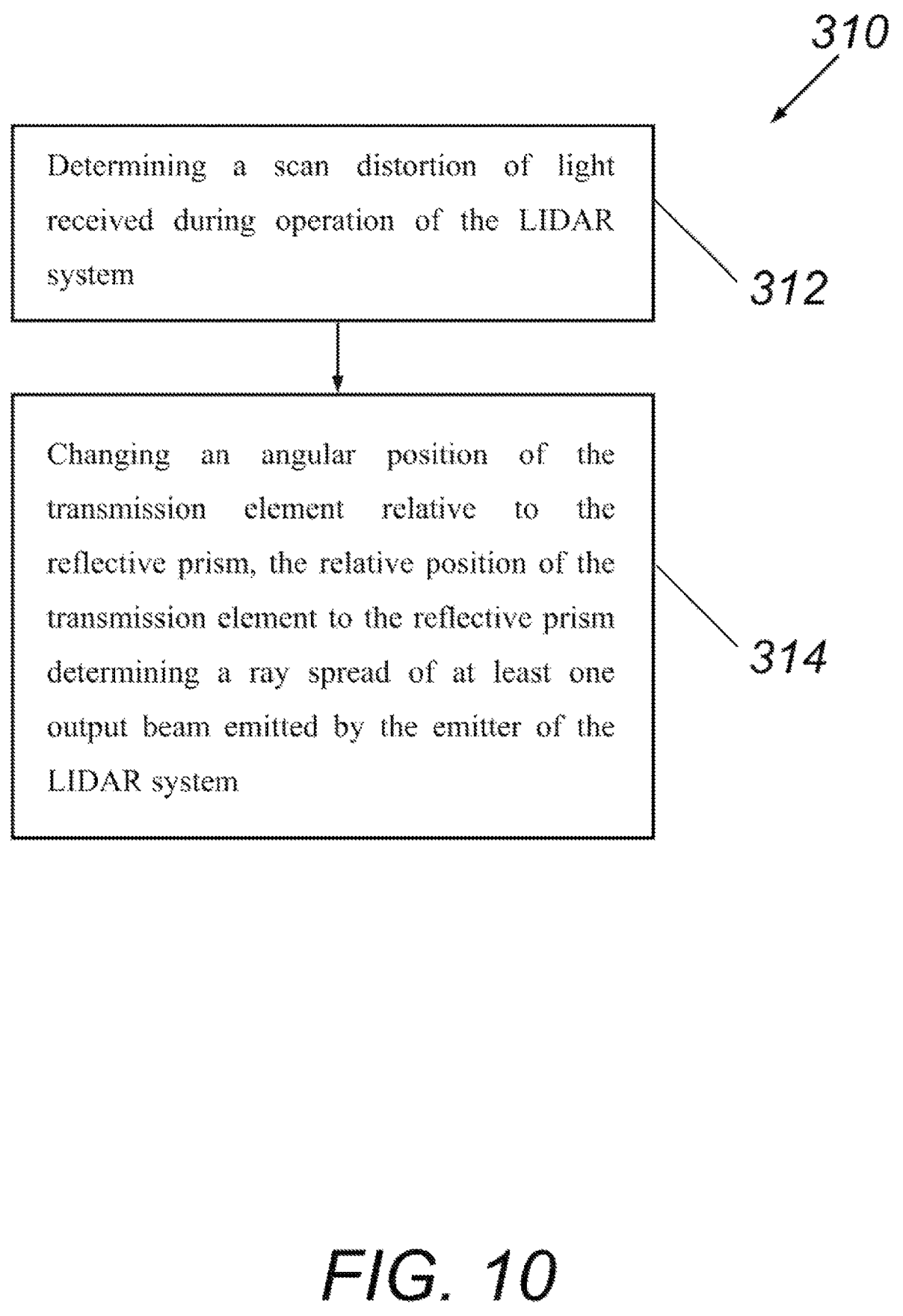

Determining a scan distortion of light received during operation of the LIDAR system

312

Changing an angular position of the transmission element relative to the reflective prism, the relative position of the transmission element to the reflective prism determining a ray spread of at least one output beam emitted by the emitter of the LIDAR system

LIDAR SYSTEMS AND METHODS

CROSS-REFERENCE

The present application claims priority to Russian Patent Application No. 2021139322, entitled "LIDAR Systems and Methods," filed Dec. 28, 2021, the entirety of which is incorporated by reference herein.

TECHNICAL FIELD

The present technology relates generally to Light Detection and Ranging (LIDAR) systems and methods for detecting objects in a surrounding environment of an autonomous vehicle.

BACKGROUND

In devices using LIDAR systems, for example autonomously driving vehicles, the dual concerns of accuracy and density of information often drive LIDAR system adaption. Broadly, light is scanned across the surrounding area and light beams reflected from surrounding objects are collected by the LIDAR system.

For periphery scanning LIDAR systems, an emitter and scanning system arrangement may in some cases implement a rotating prism with inclined faces, where a normal of each reflecting surface of the prism is arranged at a non-perpendicular angle to the axis of rotation. The inclined faces of the prism deflect the output beams incident thereon into various spatial angles. The spatial angle of the output beam depends on an incident position on the prism face.

In some LIDAR arrangements, the relative angle between the emitter and the reflecting surface can vary significantly across a field of view, due to the inclined arrangement of the reflecting surfaces relative to the axis of rotation. This phenomenon can induce a distortion or irregularity of the output beams, causing variations in sampling density. For example, near the edges in the field of view, adjacent output beams could be spread over a much larger angular area than output beams near the center.

There remains therefore a desire for LIDAR systems addressing at least some of these issues.

SUMMARY

Therefore, there is a need for systems and methods which avoid, reduce or overcome the limitations of the prior art.

In accordance with one broad aspect of the present technology, there is provided a LIDAR system including an emitter configured to emit at least one light beam; a detector configured for receiving light reflected from surrounding objects; and a rotatable scanning element configured for receiving the at least one light beam and scanning the at least one light beam out of the system by rotating about an axis of rotation. The rotatable scanning element includes a reflective prism having at least four faces inclined relative to the axis of rotation, and a ring element fixedly connected to the reflective prism, the ring element having an interior edge face extending around the axis of rotation generally in a plane orthogonal to the axis of rotation, the interior edge face having a variable angle about the axis of rotation, a normal of the interior edge face varying about the axis of rotation from perpendicular to skewed relative to the axis of rotation, the emitter, the detector, and the rotatable scanning element being arranged such that the at least one light beam is incident on the interior edge face of the ring element and subsequently on one face of the at least four faces of the reflective prism, an angle of incidence of the at least one beam on the face depending on the variable angle of the ring element, and light reflected from surrounding objects being reflected by one of the at least four faces of the reflective prism into the detector.

In some embodiments, the ring element is described by at least two planes of symmetry, each plane of symmetry transecting the axis of rotation of the reflective prism.

In some embodiments, the interior edge face has at least two parallel face zones where at least a portion of the interior edge face is substantially parallel to the axis of rotation; and at least two angled face zones, where at least another portion of the interior edge face is angled away from the axis of rotation.

In some embodiments, the interior edge face alternates between the parallel face zones and the angled face zones as the ring element extends around the axis of rotation; and the interior edge face smoothly varies in transitions between a given parallel face zone and an adjacent angled face zone.

In some embodiments, the ring element is selectively rotatable relative to the reflective prism such that the angle of incidence of the at least one beam on the reflective prism is adjustable according to a relative angular orientation between the ring element and the reflective prism.

In some embodiments, the ring element is disposed generally between the emitter and the reflective prism along a direction defined by the axis of rotation.

In some embodiments, the system is configured to perform a peripheral scan.

In some embodiments, the system is configured for connecting to a self-driving vehicle on a lateral side thereof.

In some embodiments, the reflective prism has a generally pyramidal form.

In some embodiments, the at least four faces of the reflective prism are skewed relative to the axis of rotation.

In some embodiments, the emitter is arranged to emit the at least one light beam at an angle skewed relative to the axis of rotation of the scanning element.

In accordance with another broad aspect of the present technology, there is provided a method for adjusting scan distortion of a LIDAR system, the LIDAR system including a rotatable scanning element, the method including changing an angular position of a ring element of the rotatable scanning element relative to a reflective prism of the rotatable scanning element, the relative position of the ring element to the reflective prism determining a ray spread of at least one output beam emitted by an emitter of the LIDAR system, adjustment of the scan distortion being correlated to adjustment of the ray spread of the at least one output beam.

In some embodiments, the method further includes determining, by a controller of the LIDAR system, a scan distortion of light received during operation of the LIDAR system; and wherein changing the angular position of the ring element is based on the scan distortion determined.

In some embodiments, changing the angular position of the ring element relative to the reflective prism includes positioning the ring element such that the scan distortion is minimized for at least a portion of rotation of the scanning element during operation.

In accordance with another broad aspect of the present technology, there is provided a LIDAR system including an emitter configured to emit at least one light beam; a detector configured for receiving light reflected from surrounding objects; and a rotatable scanning element configured for receiving the at least one light beam and scanning the at least one light beam out of the system by rotating about an axis of rotation. The rotatable scanning element includes a reflective prism having at least four faces inclined relative to the axis of rotation, and a transmission element fixedly connected to the reflective prism, the transmission element having an exterior edge portion extending around the axis of rotation generally in a plane orthogonal to the axis of rotation, the edge portion having a variable thickness about the axis of rotation, the emitter, the detector, and the rotatable scanning element being arranged such that: the at least one light beam is incident on and refracted by the transmission element and subsequently incident on one face of the at least four faces of the reflective prism, an angle of incidence of the at least one beam on the face depending on the variable thickness of the transmission element, and light reflected from surrounding objects being reflected by one of the at least four faces of the reflective prism into the detector.

In some embodiments, the transmission element is described by at least two planes of symmetry, each plane of symmetry transecting the axis of rotation of the reflective prism.

In some embodiments, the transmission element has at least two parallel edge portions where a first surface of the transmission element is substantially parallel to a second surface of the transmission element, the first and second surfaces being generally perpendicular to the axis of rotation; and at least two wedge portions, where at least a portion of the first surface is angled relative to the second surface, the at least two wedge portions being thicker than the at least two parallel portions.

In some embodiments, the edge of the transmission element alternates between the parallel edge portions and the wedge portions as the transmission element extends around the axis of rotation; and the edge smoothly varies in transitions between a given parallel edge portion and an adjacent angled wedge portion.

In some embodiments, the transmission element is selectively rotatable relative to the reflective prism such that the angle of incidence of the at least one beam on the reflective prism is adjustable according to a relative angular orientation between the transmission element and the reflective prism.

In some embodiments, the transmission element is disposed generally between the emitter and the reflective prism along a direction defined by the axis of rotation.

In some embodiments, the system is configured to perform a peripheral scan.

In some embodiments, the system is configured for connecting to a self-driving vehicle on a lateral side thereof.

In some embodiments, the reflective prism has a generally pyramidal form.

In some embodiments, the at least four faces of the reflective prism are skewed relative to the axis of rotation.

In some embodiments, the emitter is arranged to emit the at least one light beam at an angle skewed relative to the axis of rotation of the scanning element.

In accordance with yet another broad aspect of the present technology, there is provided a method for adjusting scan distortion of a LIDAR system, the LIDAR system including a scanning element, the method including changing an angular position of a transmission element of the rotatable scanning element relative to a reflective prism of the rotatable scanning element, the relative position of the transmission element to the reflective prism determining a ray spread of at least one output beam emitted by an emitter of the LIDAR system, adjustment of the scan distortion being correlated to adjustment of the ray spread of the at least one output beam.

In some embodiments, the method further includes determining, by a controller of the LIDAR system, a scan distortion of light received during operation of the LIDAR system; and wherein changing the angular position of the transmission element is based on the scan distortion determined.

In some embodiments, changing the angular position of the transmission element relative to the reflective prism includes positioning the transmission element such that the scan distortion is minimized for at least a portion of rotation of the rotatable scanning element during operation.

In the context of the present specification, the terms "light source" or "emitter" broadly refer to any device configured to emit radiation such as a radiation signal in the form of a beam, for example, without limitation, a light beam including radiation of one or more respective wavelengths within the electromagnetic spectrum. In one example, the light source can be a "laser source". Thus, the light sources referenced could include one or more lasers such as a solid-state laser, laser diode, a high-power laser, or an alternative light source such as, a light emitting diode (LED)-based light source. Some (non-limiting) examples of the laser source include: a Fabry-Perot laser diode, a quantum well laser, a distributed Bragg reflector (DBR) laser, a distributed feedback (DFB) laser, a fiber-laser, or a vertical-cavity surface-emitting laser (VCSEL). In addition, the laser sources may emit light beams in differing formats, such as light pulses, continuous wave (CW), quasi-CW, and so on. In some non-limiting examples, the laser sources may include a laser diode configured to emit light at a wavelength between about 650 nm and 1150 nm. Alternatively, the light sources may include a laser diode configured to emit light beams at a wavelength between about 800 nm and about 1000 nm, between about 850 nm and about 950 nm, between about 1300 nm and about 1600 nm, or in between any other suitable range. For example, depending on the particular components, the light sources could vary from 400 nm to 2000 nm.

Unless indicated otherwise, the term "about" with regard to a numeric value is defined as a variance of up to 10% with respect to the stated value.

In the context of the present specification, an "output beam" may also be referred to as a radiation beam, such as a light beam, that is generated by the radiation source and is directed downrange towards a region of interest (ROI). The output beam may have one or more parameters such as: beam duration, beam angular dispersion, wavelength, instantaneous power, photon density at different distances from light source, average power, beam power intensity, beam width, beam repetition rate, beam sequence, pulse duty cycle, wavelength, or phase etc. The output beam may be unpolarized or randomly polarized, may have no specific or fixed polarization (e.g., the polarization may vary with time), or may have a particular polarization (e.g., linear polarization, elliptical polarization, or circular polarization).

In the context of the present specification, an "input beam" is radiation or light entering the system, generally after having been reflected or scattered from one or more objects in the ROI. The "input beam" may also be referred to as a radiation beam or light beam. By reflected is meant that at least a portion of the output beam incident on one or more objects in the ROI, bounces off the one or more objects. The input beam may have one or more parameters such as: time-of-flight (i.e., time from emission until detection), instantaneous power (e.g., power signature), average power across entire return pulse, and photon distribution/signal over return pulse period etc. Depending on the particular usage, some radiation or light collected in the input beam could be from sources other than a reflected output beam. For instance, at least some portion of the input beam could include light-noise from the surrounding environment (including scattered sunlight) or other light sources exterior to the present system.

In the context of the present specification, the term "surroundings" or "environment" of a given vehicle refers to an area or a volume around the given vehicle including a portion of a current environment thereof accessible for scanning using one or more sensors mounted on the given vehicle, for example, for generating a 3D map of the such surroundings or detecting objects therein. As certain non-limiting examples, objects detected may include all or a portion of a person, vehicle, motorcycle, truck, train, bicycle, wheelchair, pushchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

In the context of the present specification, a "Region of Interest" (ROI) may broadly include a portion of the observable environment of a LIDAR system in which the one or more objects may be detected. It is noted that the region of interest of the LIDAR system may be affected by various conditions such as but not limited to: an orientation of the LIDAR system (e.g. direction of an optical axis of the LIDAR system); a position of the LIDAR system with respect to the environment (e.g. distance above ground and adjacent topography and obstacles); operational parameters of the LIDAR system (e.g. emission power, computational settings, defined angles of operation), etc. The ROI of the LIDAR the system may be defined, for example, by a plane angle or a solid angle. In one example, the ROI may also be defined within a certain distance range (e.g. up to 200 m or so).

In the context of the present specification, "controller" is any computer hardware that is capable of running software appropriate to the relevant task at hand and/or controlling or managing functionalities of connected components. In the context of the present specification, the term "electronic device" implies that a device can function as a server or controller for other electronic devices, however it is not required to be the case with respect to the present technology. Thus, some (non-limiting) examples of electronic devices include self-driving unit, personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices.

The functions of the various elements described or shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

In the context of the present specification, the words "first", "second", "third", etc. have been used as adjectives only for the purpose of allowing for distinction between the nouns that they modify from one another, and not for the purpose of describing any particular relationship between those nouns. Further, as is discussed herein in other contexts, reference to a "first" element and a "second" element does not preclude the two elements from being the same actual real-world element.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

FIG. 6 is a schematic flow chart of a method for adjusting the LIDAR system of FIG. 3;

FIG. 10 is a schematic flow chart of a method for adjusting the LIDAR system of FIG. 7.

Unless otherwise noted, the Figures are not necessarily drawn to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

With these fundamentals in place, we will now consider some non-limiting examples to illustrate various implementations of aspects of the present technology.

Figure 1:
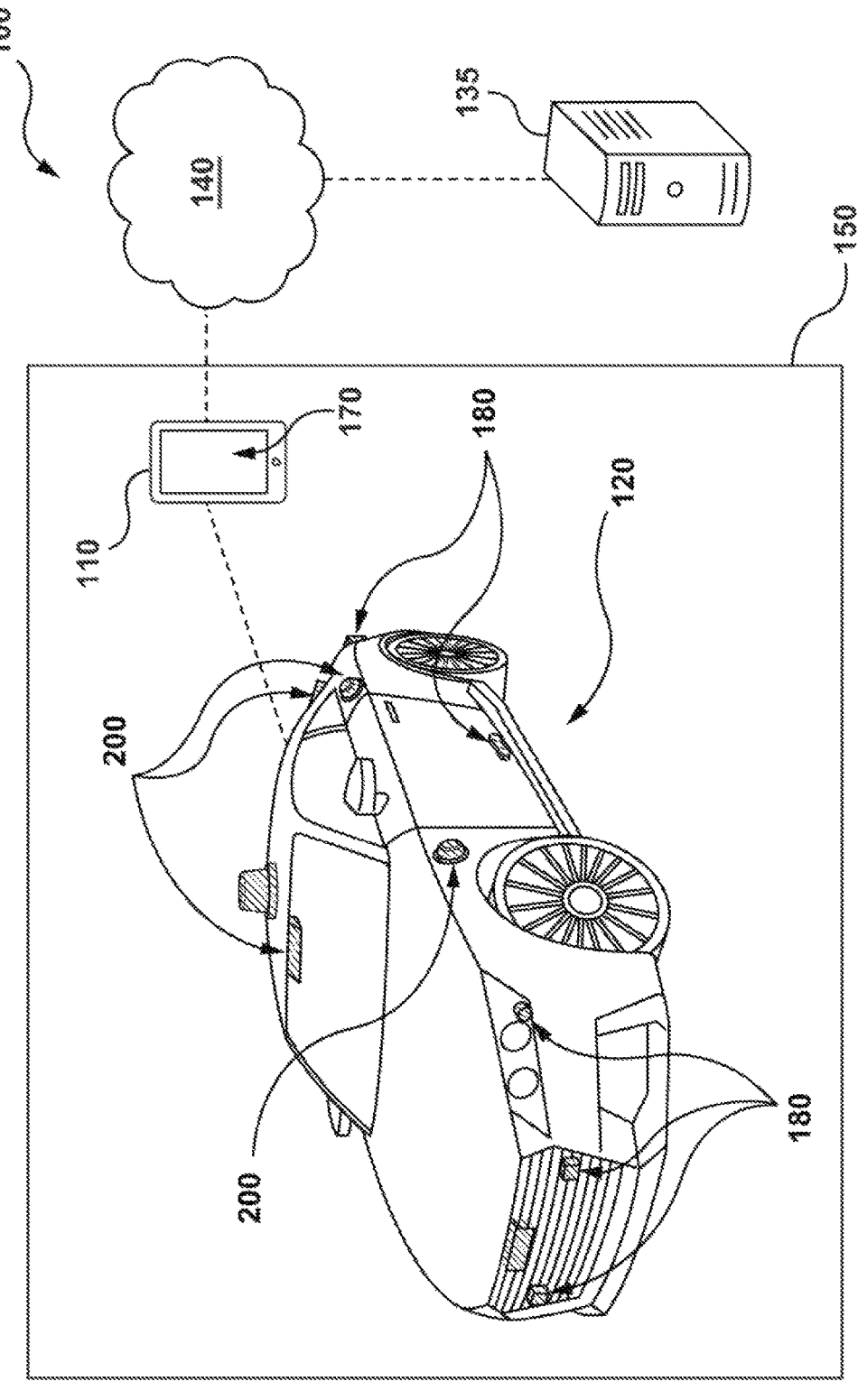
FIG. 1 depicts a schematic diagram of a networked computing environment being suitable for use with certain non-limiting embodiments of the present technology.

With reference to FIG. 1, there is depicted a networked computing environment 100 suitable for use with some non-limiting embodiments of the present technology. The networked computing environment 100 includes an electronic device 110 associated with a vehicle 120 and/or associated with a user (not depicted) who is associated with the vehicle 120 (such as an operator of the vehicle 120). The networked computing environment 100 also includes a server 135 in communication with the electronic device 110 via a communication network 140 (e.g. the Internet or the like, as will be described in greater detail herein below).

Figure 2:
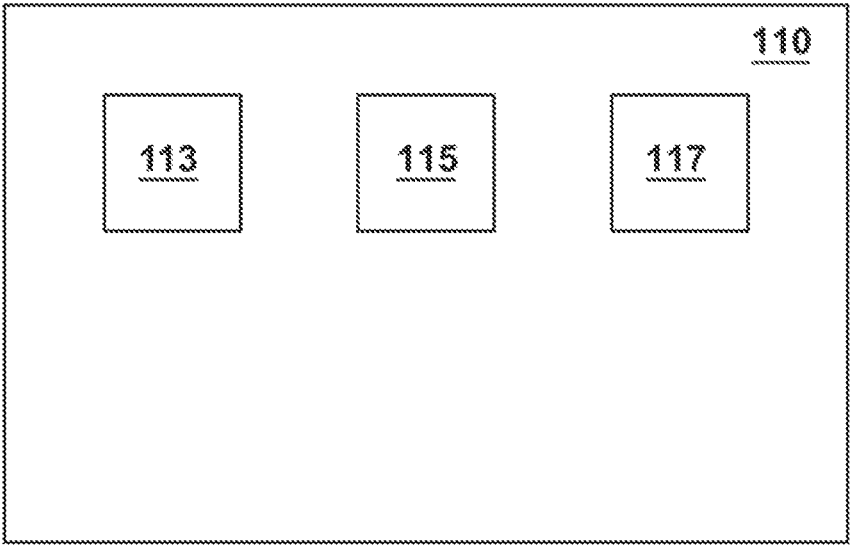
FIG. 2 depicts a schematic diagram of an electronic device configurable for implementing certain non-limiting embodiments of the present technology.

Referring to FIG. 2, there is depicted a schematic diagram of an embodiment of the electronic device 110 suitable for use with some implementations of the present technology. The computer system 100 includes various hardware components including one or more single or multi-core processors collectively represented by a processor 113, a solid-state drive 115, and a memory 117, which may be a random-access memory or any other type of memory.

Communication between the various components of the device 110 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 115 stores program instructions suitable for being loaded into the memory 117 and executed by the processor 113 for determining a presence of an object. For example, the program instructions may be part of a vehicle control application executable by the processor 113. It is noted that the device 110 may have additional and/or optional components (not depicted), such as network communication modules, localization modules, and the like.

According to the present technology, the implementation of the electronic device 110 is not particularly limited. For example, the electronic device 110 could be implemented as a vehicle engine control unit, a vehicle CPU, a vehicle navigation device (e.g. TomTom™ Garmin™), a tablet, a personal computer built into the vehicle 120, and the like. Thus, it should be noted that the electronic device 110 may or may not be permanently associated with the vehicle 120. Additionally or alternatively, the electronic device 110 could be implemented in a wireless communication device such as a mobile telephone (e.g. a smart-phone or a radio-phone). In certain embodiments, the electronic device 110 has a display 170.

In the present embodiment, the electronic device 110 includes the components of the computer system 100 depicted in FIG. 2, but some components could be omitted or modified depending on the particular embodiment. In certain embodiments, the electronic device 110 is an on-board computer device and includes the processor 113, the solid-state drive 115 and the memory 117. In other words, the electronic device 110 includes hardware and/or software and/or firmware, or a combination thereof, for processing data as will be described in greater detail below.

Returning to FIG. 1, in some non-limiting embodiments of the present technology, the networked computing environment 100 could include a GPS satellite (not depicted) transmitting and/or receiving a GPS signal to/from the electronic device 110. It will be understood that the present technology is not limited to GPS and may employ a positioning technology other than GPS. It should be noted that the GPS satellite can be omitted altogether.

The vehicle 120, to which the electronic device 110 is associated, could be any transportation vehicle, for leisure or otherwise, such as a private or commercial car, truck, motorbike or the like. Although the vehicle 120 is depicted as being a land vehicle, this may not be the case in each and every non-limiting embodiment of the present technology. For example, in certain non-limiting embodiments of the present technology, the vehicle 120 may be a watercraft, such as a boat, or an aircraft, such as a flying drone.

The vehicle 120 may be user operated or a driver-less vehicle. In some non-limiting embodiments of the present technology, it is contemplated that the vehicle 120 could be implemented as a Self-Driving Car (SDC). It should be noted that specific parameters of the vehicle 120 are not limiting, these specific parameters including for example: vehicle manufacturer, vehicle model, vehicle year of manufacture, vehicle weight, vehicle dimensions, vehicle weight distribution, vehicle surface area, vehicle height, drive train type (e.g. 2× or 4×), tire type, brake system, fuel system, mileage, vehicle identification number, and engine size.

In some non-limiting embodiments of the present technology, the communication network 140 is the Internet. In alternative non-limiting embodiments of the present technology, the communication network 140 can be implemented as any suitable local area network (LAN), wide area network (WAN), a private communication network or the like. It should be expressly understood that implementations for the communication network 140 are for illustration purposes only. A communication link (not separately numbered) is provided between the electronic device 110 and the communication network 140, the implementation of which will depend, inter alia, on how the electronic device 110 is implemented. Merely as an example and not as a limitation, in those non-limiting embodiments of the present technology where the electronic device 110 is implemented as a wireless communication device such as a smartphone or a navigation device, the communication link can be implemented as a wireless communication link. Examples of wireless communication links may include, but are not limited to, a 3G communication network link, a 4G communication network link, and the like. The communication network 140 may also use a wireless connection with the server 135.

In some embodiments of the present technology, the server 135 is implemented as a computer server and could include some or all of the components of the device 110 of FIG. 2, such as processors, solid-state drives, and/or memory devices. In one non-limiting example, the server 135 is implemented as a Dell™ PowerEdge™ Server running the Microsoft™ Windows Server™ operating system but can also be implemented in any other suitable hardware, software, and/or firmware, or a combination thereof. In the depicted non-limiting embodiments of the present technology, the server 135 is a single server. In alternative non-limiting embodiments of the present technology, the functionality of the server 135 may be distributed and may be implemented via multiple servers (not shown).

In some non-limiting embodiments of the present technology, the processor 113 of the electronic device 110 could be in communication with the server 135 to receive one or more updates. Such updates could include, but are not limited to, software updates, map updates, routes updates, weather updates, and the like. In some non-limiting embodiments of the present technology, the processor 113 can also be configured to transmit to the server 135 certain operational data, such as routes travelled, traffic data, performance data, and the like. Some or all such data transmitted between the vehicle 120 and the server 135 may be encrypted and/or anonymized.

It should be noted that a variety of sensors and systems may be used by the electronic device 110 for gathering information about surroundings 150 of the vehicle 120. As seen in FIG. 1, the vehicle 120 may be equipped with a plurality of sensor systems 180. It should be noted that different sensor systems from the plurality of sensor systems 180 may be used for gathering different types of data regarding the surroundings 150 of the vehicle 120.

In one example, the plurality of sensor systems 180 may include various optical systems including, inter alia, one or more camera-type sensor systems that are mounted to the vehicle 120 and communicatively coupled to the processor 113 of the electronic device 110. Broadly speaking, the one or more camera-type sensor systems may be configured to gather image data about various portions of the surroundings 150 of the vehicle 120. In some cases, the image data provided by the one or more camera-type sensor systems could be used by the electronic device 110 for performing object detection procedures. For example, the electronic device 110 could be configured to feed the image data provided by the one or more camera-type sensor systems to an Object Detection Neural Network (ODNN) that has been trained to localize and classify potential objects in the surroundings 150 of the vehicle 120.

In another example, the plurality of sensor systems 180 could include one or more radar-type sensor systems that are mounted to the vehicle 120 and communicatively coupled to the processor 113. Broadly speaking, the one or more radar-type sensor systems may be configured to make use of radio waves to gather data about various portions of the surroundings 150 of the vehicle 120. For example, the one or more radar-type sensor systems may be configured to gather radar data about potential objects in the surroundings 150 of the vehicle 120, such data potentially being representative of a distance of objects from the radar-type sensor system, orientation of objects, velocity and/or speed of objects, and the like.

It should be noted that the plurality of sensor systems 180 could include additional types of sensor systems to those non-exhaustively described above and without departing from the scope of the present technology.

According to the present technology and as is illustrated in FIG. 1, the vehicle 120 is equipped with at least one Light Detection and Ranging (LIDAR) system, such as a LIDAR system 200, for gathering information about surroundings 150 of the vehicle 120. While described herein in the context of being attached to the vehicle 120, it is also contemplated that the LIDAR system 200 could be a stand-alone operation or connected to another system. Although not illustrated, it is also contemplated that a LIDAR system 300 described herein could be connected to the vehicle 120 in place or in addition to the LIDAR system 200.

Depending on the embodiment, the vehicle 120 could include more or fewer LIDAR systems 200 than illustrated. Depending on the particular embodiment, choice of inclusion of particular ones of the plurality of sensor systems 180 could depend on the particular embodiment of the LIDAR system 200. The LIDAR system 200 could be mounted, or retrofitted, to the vehicle 120 in a variety of locations and/or in a variety of configurations.

For example, depending on the implementation of the vehicle 120 and the LIDAR system 200, the LIDAR system 200 could be mounted on an interior, upper portion of a windshield of the vehicle 120. Nevertheless, as illustrated in FIG. 1, other locations for mounting the LIDAR system 200 are within the scope of the present disclosure, including on a back window, side windows, front hood, rooftop, front grill, front bumper or the side of the vehicle 120. In some cases, the LIDAR system 200 can even be mounted in a dedicated enclosure mounted on the top of the vehicle 120.

In non-limiting embodiments of the present technology, also illustrated in FIG. 1, the LIDAR systems 200, 300 described herein are generally mounted to the sides of the vehicle 120, although different configurations are contemplated. For example, one or more of the LIDAR systems 200, 300 could be mounted to the vehicle 120 on front or rear portions, or in corner position, of the vehicle 120.

Irrespective of the specific location and/or the specific configuration of the LIDAR system 200, it is configured to capture data about the surroundings 150 of the vehicle 120 used, for example, for building a multi-dimensional map of objects in the surroundings 150 of the vehicle 120. In embodiments where the LIDAR system 200 is installed in a location other than in the vehicle 120, the LIDAR systems 200 could be configured to capture the data about some predetermined surroundings of the location of the LIDAR system 200.

It should be noted that although in the description provided herein the LIDAR system 200 is implemented as a Time of Flight LIDAR system—and as such, includes respective components suitable for such implementation thereof—other implementations of the LIDAR system 200 are also possible without departing from the scope of the present technology.

Figure 3:
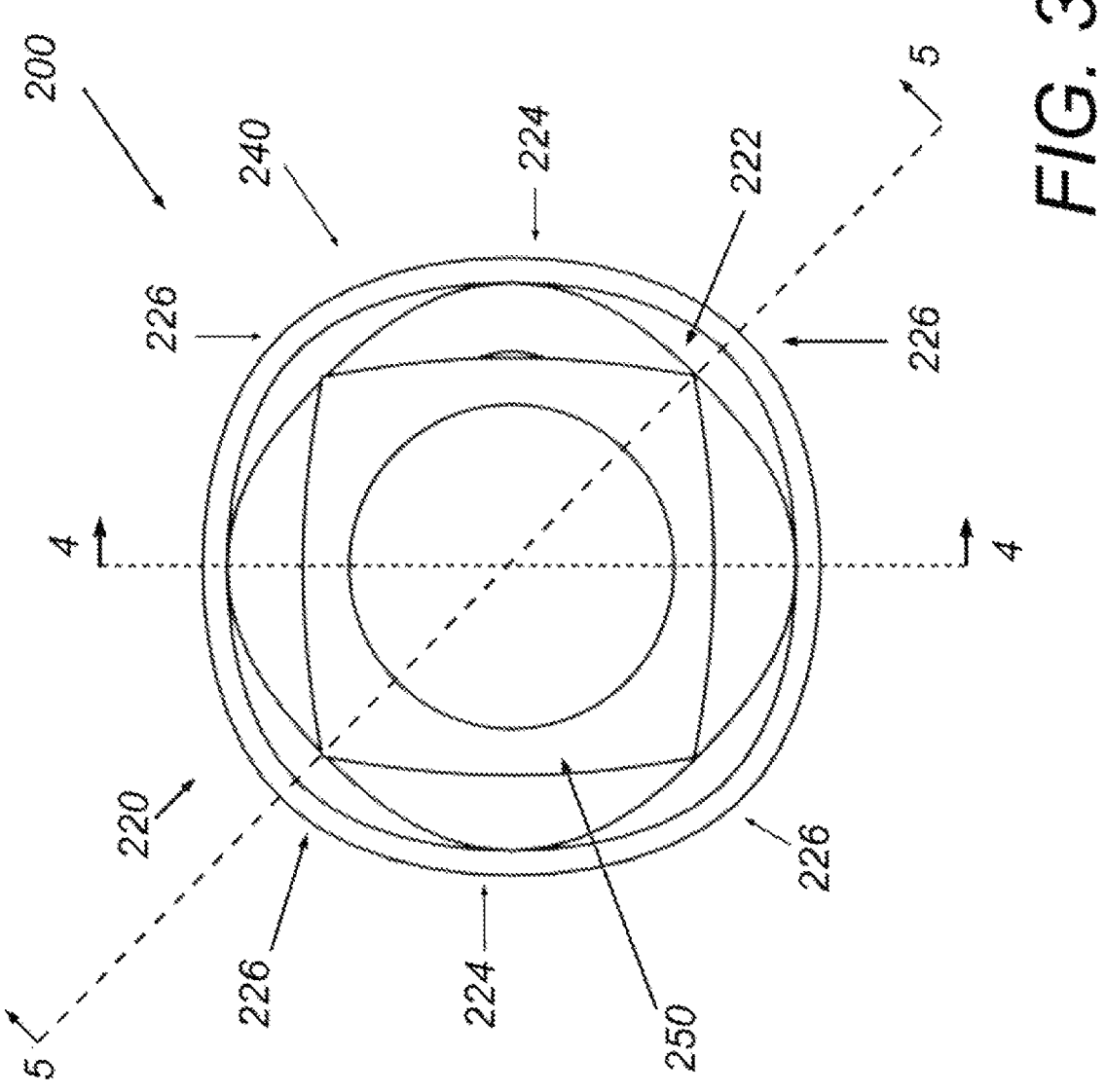
FIG. 3 is a top schematic view of a LIDAR system according to non-limiting embodiments of the present technology.
Figure 4:
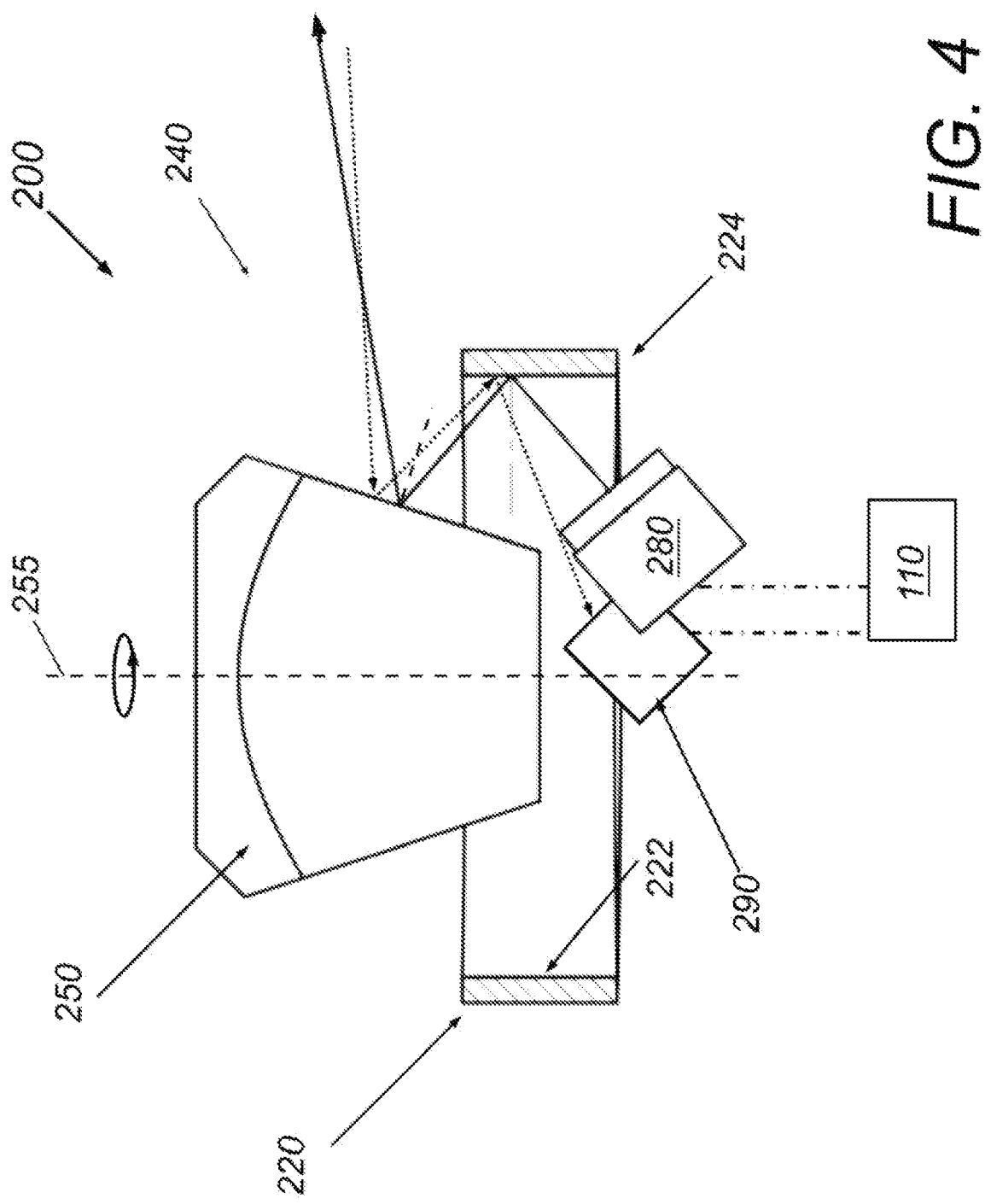
FIG. 4 is a cross-sectional view of the LIDAR system of FIG. 3, taken along line 4-4 of FIG. 3.
Figure 5:
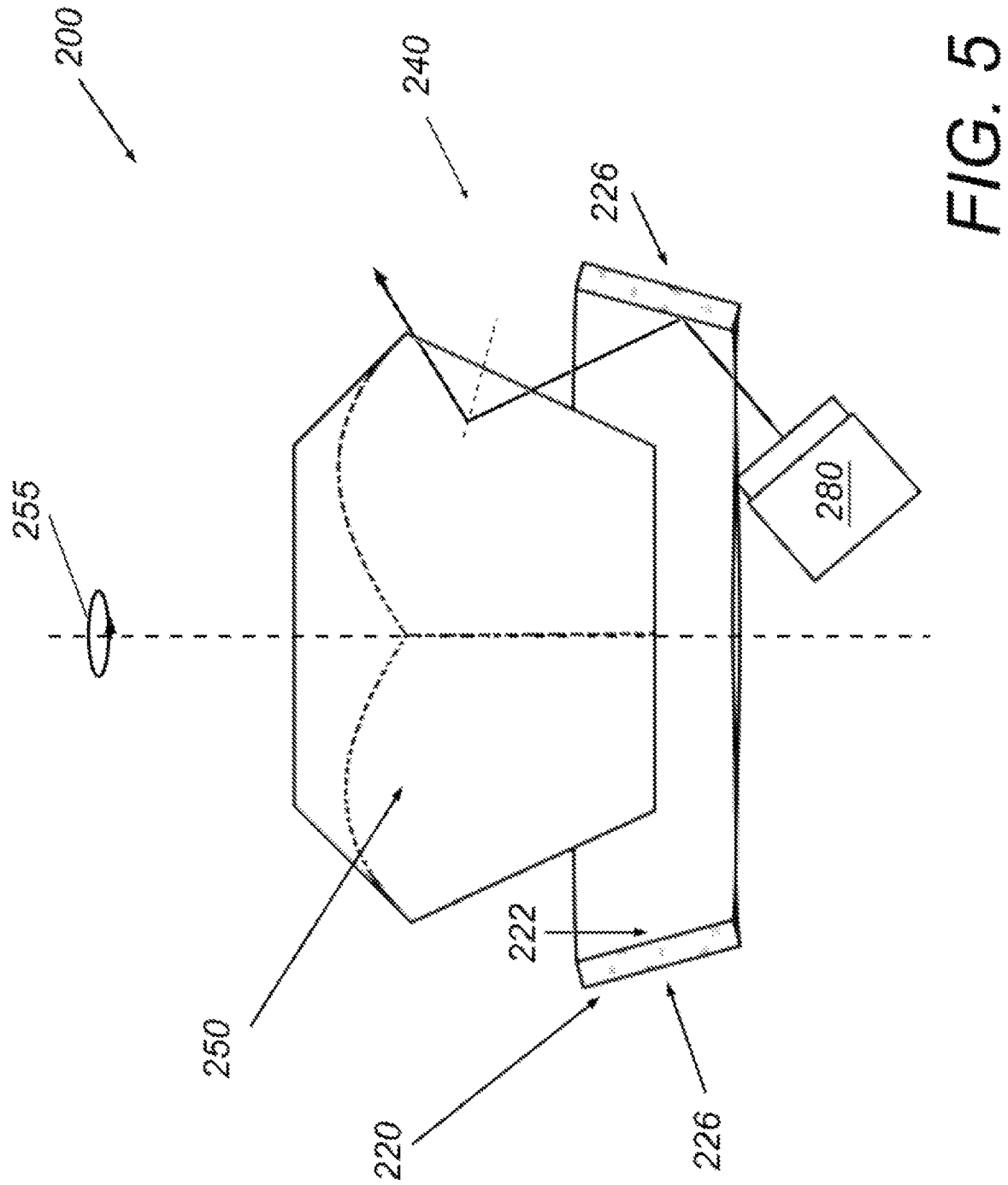
FIG. 5 is another cross-sectional view of the LIDAR system of FIG. 3, taken along line 5-5 of FIG. 3.

With reference to FIGS. 3 to 5, the LIDAR system 200 according to one non-limiting embodiment of the present technology will be described in more detail. It is noted that the LIDAR system 200 is illustrated schematically, and additional details and/or components for operating the LIDAR system 200 would be understood by a person of skill in the art.

Broadly speaking, the LIDAR system 200 includes a variety of internal components including, but not limited to: (i) an emitter 280 configured to emit at least one light beam (also referred to as a "laser source" or a "light source"), (ii) a beam splitting element (not shown), (iii) a rotatable scanning element 240 (also referred to as a "scanner assembly"), (iv) a detector 290 (shown in FIG. 4) configured for receiving input beams (also referred to as a "detection system" or "receiving assembly") and (v) a controller, in this case the electronic device 110. It is contemplated that in addition to the components non-exhaustively listed above, the LIDAR system 200 could include a variety of components (such as, for example, sensors, beam controlling optics, mechanical structures, housing, etc.) which are omitted from the Figures for sake of clarity. In certain non-limiting embodiments of the present technology, one or more of the internal components of the LIDAR system 200 are disposed in a common housing (not shown).

Broadly speaking, the LIDAR system 200 operates as follows: the emitter 280 of the LIDAR system 200 emits pulses of light, forming an output beam (solid arrows in FIG. 4); the scanning element 240 scans the output beam across the surroundings 150 of the vehicle 120 for locating/capturing data of apriori unknown objects therein, for example, for generating a map of the surroundings 150 where objects are represented in a form of one or more data points. The scanning element 240 will be described in more detail below.

Once the output beam reaches one or more objects in the surroundings, the object(s) generally reflects at least a portion of light from the output beam, and some of the reflected light beams may return back towards the LIDAR system 200, to be received in the form of an input beam (dotted lines in FIG. 4). It is noted that a portion of the light of the output beam may be absorbed or scattered by objects in the surroundings.

The input beam, when arriving at the LIDAR system 200, is received by the scanning element 240 and directed thereby to the detector 290. The input beam is then captured and detected by the detector 290. In response, the detector 290 is then configured to generate one or more representative data signals. For example, the detector 290 may generate an output electrical signal (not depicted) that is representative of the input beam. The detector 290 may also provide the so-generated electrical signal to the controller 110 for further processing. Finally, by measuring a time between emitting the output beam and receiving the input beam, the distance(s) to the objects in the surroundings 150 are calculated by the controller 110.

The emitter 280 is communicatively coupled to the controller 110 and is configured to emit light having a given operating wavelength. To that end, in certain non-limiting embodiments of the present technology, the emitter 280 could include at least one laser pre-configured for operation at the given operating wavelength. The given operating wavelength of the emitter 280 may be in the infrared, visible, and/or ultraviolet portions of the electromagnetic spectrum. The operating wavelength could generally be limited by factors including, but not limited to, specifications of narrow bandpass filters disposed in the system and responsivity of detectors in the system. For example, the emitter 280 may include at least one laser with an operating wavelength between about 650 nm and 1150 nm. Alternatively, the emitter 280 may include a laser diode configured to emit light at a wavelength between about 800 nm and about 1000 nm, between about 850 nm and about 950 nm, or between about 1300 nm and about 1600 nm. In certain other embodiments, the emitter 280 could include a light emitting diode (LED).

The emitter 280 is generally an eye-safe laser, or put another way, the LIDAR system 200 may be classified as an eye-safe laser system or laser product. Broadly speaking, an eye-safe laser, laser system, or laser product may be a system with some or all of: an emission wavelength, average power, peak power, peak intensity, pulse energy, beam size, beam divergence, exposure time, or scanned output beam such that emitted light from this system presents little or no possibility of causing damage to a person's eyes.

To perform Time of Flight (ToF) LIDAR measurements, the emitter 280 is generally a pulsed source configured to produce, emit, or radiate pulses of light with a certain pulse duration. For example, in some non-limiting embodiments of the present technology, the emitter 280 may be configured to emit pulses with a pulse duration (e.g., pulse width) ranging from 10 ps to 100 ns. In other non-limiting embodiments of the present technology, the emitter 280 may be configured to emit pulses at a pulse repetition frequency of approximately 100 kHz to 5 MHz or a pulse period (e.g., a time between consecutive pulses) of approximately 200 ns to 10 μs. Overall, however, the emitter 280 can generate the output beam with any suitable average optical power, and the output beam may include optical pulses with any suitable pulse energy or peak optical power for a given application.

In some non-limiting embodiments of the present technology, the emitter 280 could include one or more laser diodes, including but not limited to: Fabry-Perot laser diode, a quantum well laser, a distributed Bragg reflector (DBR) laser, a distributed feedback (DFB) laser, or a vertical-cavity surface-emitting laser (VCSEL). Just as examples, a given laser diode operating in the emitter 280 may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable laser diode. It is also contemplated that the emitter 280 may include one or more laser diodes that are current modulated to produce optical pulses.

In some non-limiting embodiments of the present technology, the emitter 280 is generally configured to emit the output beam that is a collimated optical beam, but it is contemplated that the beam produced could have any suitable beam divergence for a given application. Broadly speaking, divergence of the output beam is an angular measure of an increase in beam cross-section size (e.g., a beam radius or beam diameter) as the output beam travels away from the emitter 280 or the LIDAR system 200. In some non-limiting embodiments of the present technology, the output beam may have a substantially circular cross-section. It is also contemplated that the output beam emitted by emitter 280 could be unpolarized or randomly polarized, could have no specific or fixed polarization (e.g., the polarization may vary with time), or could have a particular polarization (e.g., the output beam may be linearly polarized, elliptically polarized, or circularly polarized).

In at least some non-limiting embodiments of the present technology, the output beam and the input beam may be substantially coaxial. In other words, the output beam and input beam may at least partially overlap or share a common propagation axis, so that the input beam and the output beam travel along substantially the same optical path (albeit in opposite directions). Nevertheless, in other non-limiting embodiments of the present technology, the output beam and the input beam may not be coaxial, or in other words, may not overlap or share a common propagation axis inside the LIDAR system 200, without departing from the scope of the present technology. In the schematic illustration of the Figures, the output and input beams are illustrated spaced from one another simply for ease of reference.

Depending on the embodiment, the controller communicatively coupled to the emitter 280 and the detector 290 may include one or more processors, an application-specific integrated circuit (ASIC), a field-programmable gate array (FPGA), and/or other suitable circuitry. Embodied by the electronic device 110 in the present embodiments, the controller 110 may also include non-transitory computer-readable memory to store instructions executable by the controller 110 as well as data which the controller 110 may produce based on the signals acquired from other internal components of the LIDAR system 200 and/or may provide signals to the other internal components of the LIDAR system 200. The memory can include volatile (e.g., RAM) and/or non-volatile (e.g., flash memory, a hard disk) components. The controller 110 may be configured to generate data during operation and store it in the memory. For example, this data generated by the controller 110 may be indicative of the data points in the distance-information point cloud of the LIDAR system 200. In addition to collecting data from the detector 290, the controller 110 could also be configured to provide control signals to, and potentially receive diagnostics data from, the emitter 280 and the detector 290.

In some non-limiting embodiments of the present technology, the controller 110 may be configured to receive electrical trigger pulses from the emitter 280, where each electrical trigger pulse corresponds to the emission of an optical pulse by the emitter 280. The controller 110 may further provide instructions, a control signal, and/or a trigger signal to the emitter 280 indicating when the emitter 280 is to produce optical pulses indicative, for example, of the output beam. It is also contemplated that the controller 110 may cause the emitter 280 to adjust one or more characteristics of output beam produced by the emitter 280 such as, but not limited to: frequency, period, duration, pulse energy, peak power, average power, and wavelength of the optical pulses.

By the present technology, the controller 110 is configured to determine a "time-of-flight" value for an optical pulse in order to determine the distance between the LIDAR system 200 and one or more objects in the field of view, as will be described further below. The time of flight is based on timing information associated with (i) a first moment in time when a given optical pulse (for example, of the output beam) was emitted by the emitter 280, and (ii) a second moment in time when a portion of the given optical pulse (for example, from the input beam) was detected or received by the detector 290, specifically when the input beam is detected by the detector 290. In some non-limiting embodiments of the present technology, the first moment may be indicative of a moment in time when the controller 110 emits a respective electrical pulse associated with the given optical pulse; and the second moment in time may be indicative of a moment in time when the controller 110 receives, from the detector 290, an electrical signal generated in response to receiving the portion of the given optical pulse from the input beam.

By the present technology, the controller 110 is configured to determine, based on the first moment in time and the second moment in time, a time-of-flight (ToF) value and/or a phase modulation value for the emitted pulse of the output beam. The time-of-light value T, in a sense, a "round-trip" time for the emitted pulse to travel from the LIDAR system 200 to an object and back to the LIDAR system 200. The controller 110 is thus broadly configured to determine a distance to an object in accordance with the following equation:

$$D = \frac{c \cdot T}{2}, \tag{1}$$

wherein D is the distance to be determined, T is the time-of-flight value, and c is the speed of light (approximately $3.0 \times 10^8$ m/s).

It should be noted that, in various non-limiting embodiments of the present technology, the LIDAR system 200 could include additional optical components. For example, the LIDAR system 200 may include one or more optical components configured to condition, shape, filter, modify, steer, or direct the output beam and/or the input beam. For example, the LIDAR system 200 may include one or more lenses, mirrors, filters (e.g., band pass or interference filters), optical fibers, circulators, beam splitters, polarizers, polarizing beam splitters, wave plates (e.g., half-wave or quarter-wave plates), diffractive elements, microelectromechanical (MEM) elements, collimating elements, or holographic elements.

Generally speaking, the rotatable scanning element 240 steers the output beam in one or more directions downrange towards the surroundings 150 and conversely steers the input beam upon arrival at the LIDAR system 200 to the detector 290. The rotatable scanning element 240 is communicatively coupled to the controller 110. As such, the controller 110 is configured to control the rotatable scanning element 240 so as to guide the output beam in a desired direction downrange and/or along a predetermined scan pattern. Broadly speaking, in the context of the present specification "scan pattern" may refer to a pattern or path along which the output beam is directed by the rotatable scanning element 240 during operation.

With continued reference to FIGS. 3 to 5, the rotatable scanning element 240 will be described in more detail. The rotatable scanning element 240 is configured for receiving the output light beam and scanning the output beams out of the system 200 by rotating about an axis of rotation 255. It is contemplated that the scanning element 240 could be controlled to oscillate in two directions, rather than rotating in a single direction, in some cases. In the present embodiment, the rotatable scanning element 240 includes a reflective prism 250 and a ring element 220 fixedly connected to the reflective prism 250. The LIDAR system 200 is configured to perform a peripheral scan using the scanning element 240. As is illustrated in the present non-limiting example, the LIDAR system 200 is configured for connecting to the self-driving vehicle 120 on a lateral side thereof. It is contemplated, however, that specific placement of the LIDAR system 200 on the vehicle 120 could vary.

The reflective prism 250 has four faces inclined relative to the axis of rotation 255. More specifically, the four reflective faces of the reflective prism 250 are skewed relative to the axis of rotation 255. In at least some embodiments, it is contemplated that the reflective prism 250 could be formed with more than four reflective faces. In present embodiment, the reflective prism 250 has a generally pyramidal form, and more specifically the form of a truncated, four-sided pyramid. The reflective prism 250 is arranged with the larger dimension vertically above the smaller dimension of the truncated pyramid, such that the output beam from the emitter 280, disposed generally below the reflective prism 250, is received generally from below the reflective prism 250 and is then directed generally outward. As can be seen in FIG. 4, the emitter 280 is further arranged to emit the output beam at an angle skewed relative to the axis of rotation 255 of the scanning element 240.

The rotatable scanning element 240 further includes the ring element 220 connected to the reflective prism 250. The ring element 220 is fixedly coupled to the reflective prism 250, such that both the ring element 220 and the reflective prism 250 rotate together, in a fixed relative angular position, during operation of the LIDAR system 200. Although not illustrated herein, the fastening system maintaining the relative angular position between the ring element 220 and the reflective prism 250 is further configured to allow adjustments, by a user, to the relative angular position for calibration of the rotatable scanning element 240.

The ring element 220 has an interior edge face 222 extending around the axis 255 generally in a plane orthogonal to the axis of rotation 255. The interior edge face 222 has a variable angle about the axis 255. More specifically, a normal of the interior edge face 222 varies about the axis of rotation 255 from perpendicular (see FIG. 4) to skewed relative to the axis of rotation 255 (see FIG. 5). In the illustrated embodiment the outer surface of the ring element 220 generally follows the form of the interior edge face 222, such that the thickness of the ring element 220 is generally consistent above the axis. It is contemplated as well that the outer surface of the ring element 220 could be circularly symmetric and generally parallel to the axis 255 (with varying thickness of the ring element 220).

As can be seen in FIG. 3, the ring element 220 is described by at least two planes of symmetry, each plane of symmetry transecting the axis of rotation 255 of the reflective prism 250. two of these planes of symmetry are illustrated by lines 4-4 and 5-5. It is contemplated the different embodiments of the ring element 220 could have more or fewer lines of symmetry; for instance, ring elements configured to work with prisms of more or fewer than four sides could have a different angular form.

The interior edge face 222 of the ring element 220 has four parallel face zones 224, where at least a portion of the interior edge face 222 is substantially parallel to the axis of rotation 255 (see FIG. 4). The parallel face zones 224 are oppositely disposed about the axis of rotation 255. The interior edge face 222 also has four angled face zones 226, where at least a portion of the interior edge face 222 is angled away from the axis of rotation 255. The interior edge face 222 alternates between the parallel face zones 224 and the angled face zones 226 as the ring element 220 extends about the axis of rotation 255. It should be noted that interior edge face 222 smoothly varies in transitions between a given parallel face zone 224 and an adjacent angled face zone 246, such that abrupt transition or edges of the reflective surface formed by the interior edge face 222 are avoided.

The ring element 220 is disposed generally between the emitter 280 and the reflective prism 250 along the direction defined by the axis of rotation 255. In the illustrated orientation of the LIDAR system 200, the ring element 220 is disposed vertically between a top edge of the reflective prism 250 and a bottom edge of the emitter 280. It is noted that the LIDAR system 200 could be used in different orientations, and the directions described herein are simply for ease of explanation. As is mentioned above, the ring element 220 is selectively rotatable, when the LIDAR system 200 is not in use, relative to the reflective prism 250 such that the angle of incidence of the output beam on the reflective prism 250 is adjustable according to a relative angular orientation between the ring element 220 and the reflective prism 250.

According to the present technology, the emitter 280, the detector 290, and the rotatable scanning element 240 are arranged such that the output beam is incident on the interior edge face 222 of the ring element 220 and subsequently on one face of the four faces of the reflective prism 250. The angle of incidence of the output beam on the face of the reflective prism 250 thus depends on the variable angle of the ring element 220, specifically on the interior edge face 222. In this way, the relative position of the ring element 220 to the reflective prism 250 determines a ray spread of the output beam across different positions of the scanning element 240, which in turn determines the regularity, or irregularity, of the point density of the data map determined by the LIDAR system 200. By providing a manner for adjusting of the angles of incidence on the reflective prism 250, provided by the variable angle interior face 222 of the ring element 220, distortion of the point cloud over a given field of view can be calibrated.

With reference to FIG. 6, a non-limiting embodiment of a method 210 for adjusting scan distortion of a LIDAR system, particularly the LIDAR system 200 in the present embodiment.

The method 210 includes, at step 214, with changing an angular position of the ring element 220 relative to the reflective prism 250. As is mentioned above, the relative position of the ring element 220 to the reflective prism 250 determines the ray spread of the output beam emitted by the emitter 280, and more specifically the uniformity thereof. Thus, adjustment of the scan distortion is correlated to adjustment of the ray spread of the output beams, since the relative grouping of output beams (ray spread) is directly related to the angle of incidence of the output beam on the reflective prism 250, which in turn is adjustable using different portions of the interior edge face 222 of the ring element 220.

In at least some embodiments, the method 210 begins, at step 212, with first determining, by the controller 110, a scan distortion of light received during operation of the LIDAR system 200. In such a case, the method 210 could be performed as a calibration, in order to best accommodate spreading of the output beam in different portions of the field of view. The changing the angular position of the ring element 220, of step 214, is then based on the scan distortion determined in step 212.

In at least some embodiments, changing the angular position of the ring element 220 relative to the reflective prism 250 includes positioning the ring element 220 such that the scan distortion is minimized for at least a portion of rotation of the rotatable scanning element 240 during operation.

Figure 7:
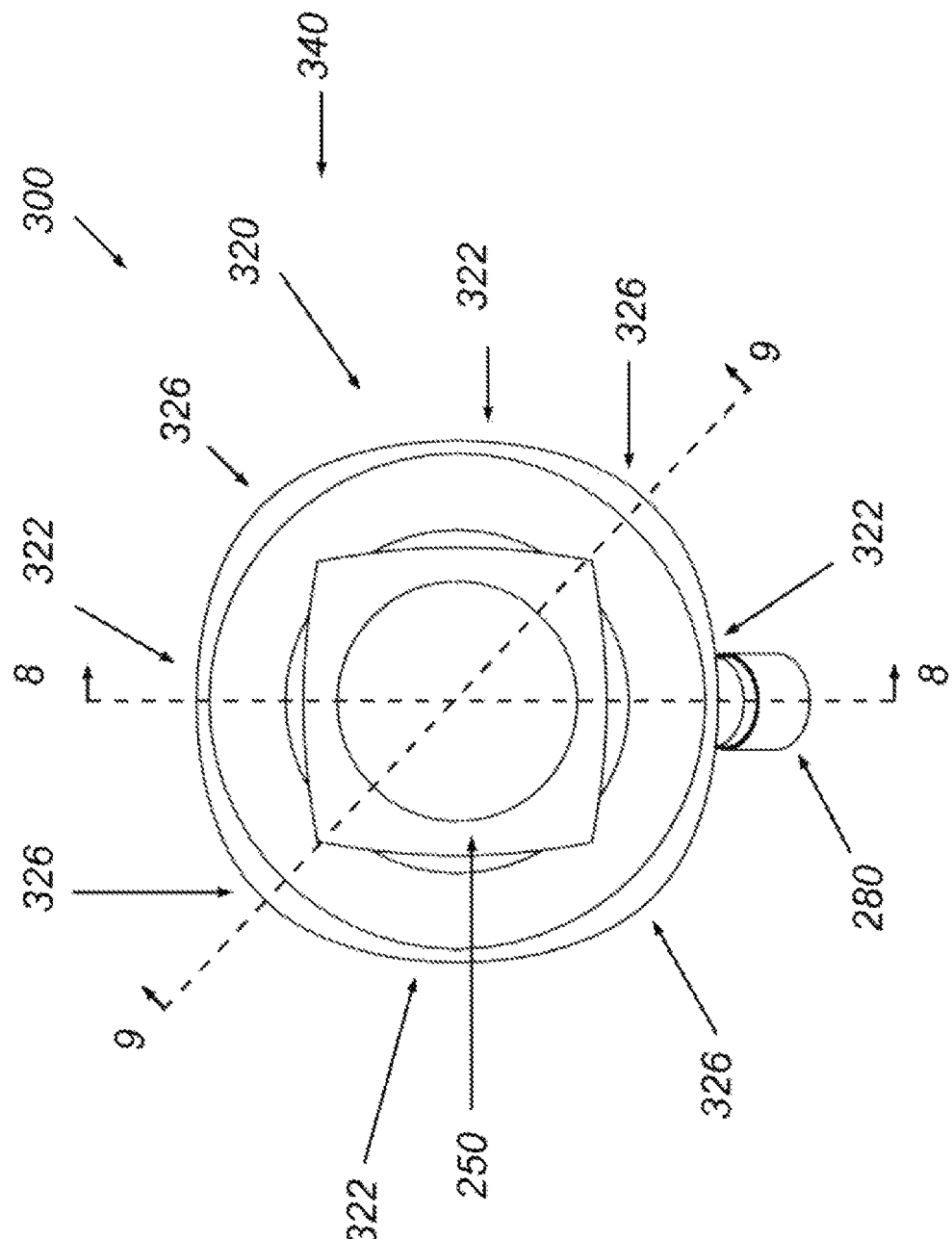
FIG. 7 is a top schematic view of another LIDAR system according to non-limiting embodiments of the present technology.
Figure 8:
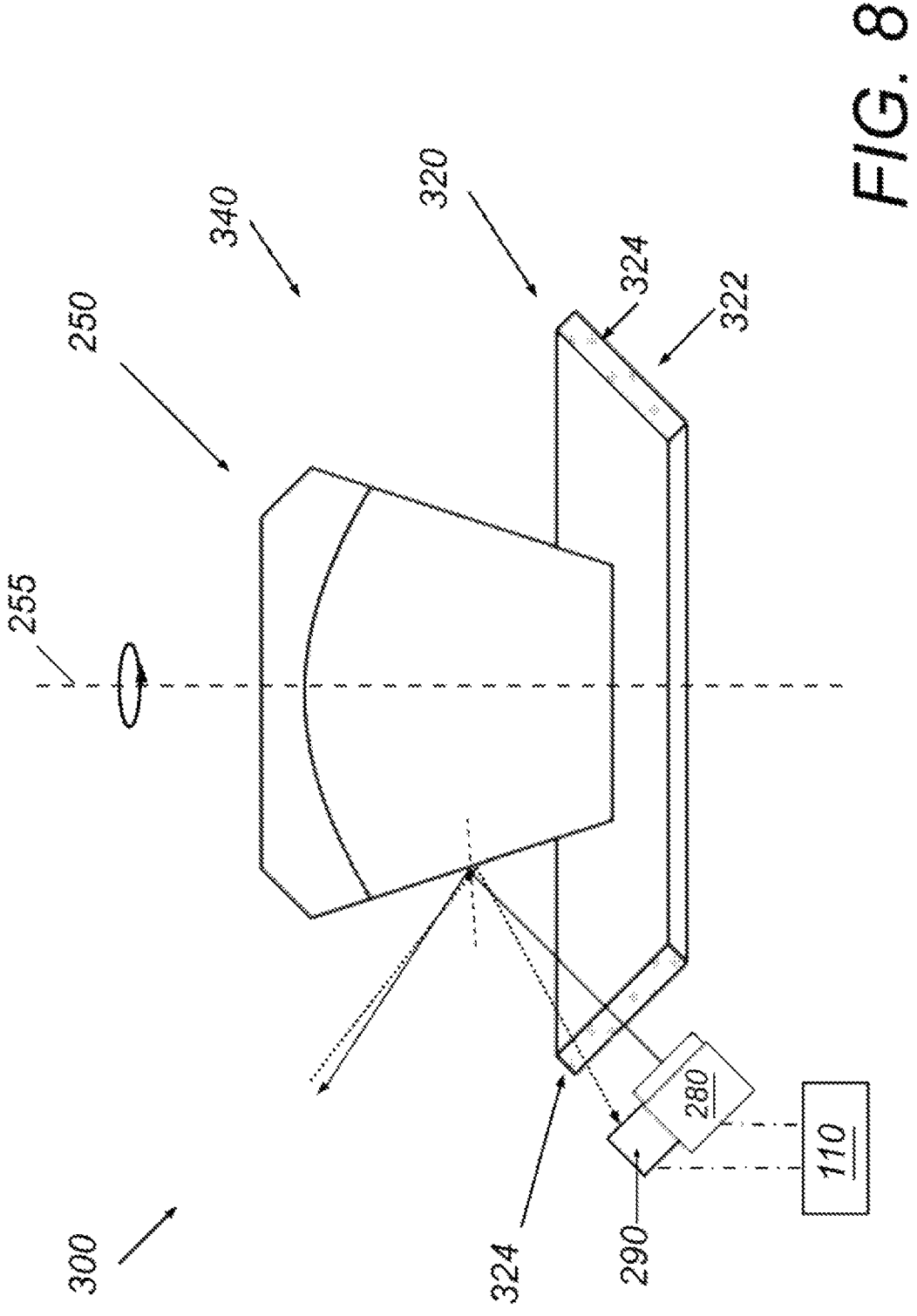
FIG. 8 is a cross-sectional view of the LIDAR system of FIG. 7, taken along line 8-8 of FIG. 7.
Figure 9:
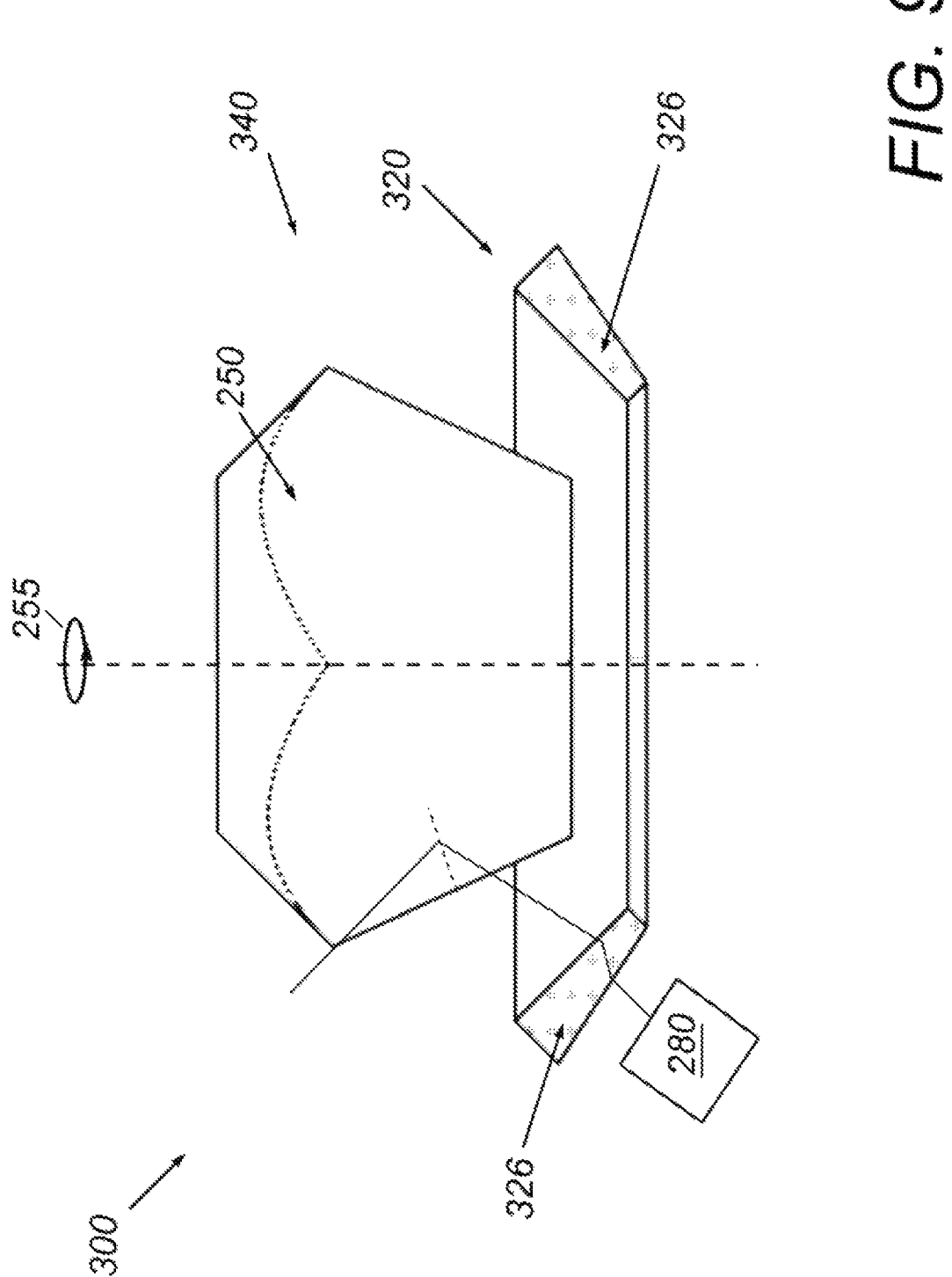
FIG. 9 is another cross-sectional view of the LIDAR system of FIG. 7, taken along line 9-9 of FIG. 7.

With reference to FIGS. 7 to 9, another non-limiting embodiment of a LIDAR system 300 is illustrated. It is noted that the LIDAR system 300 is illustrated schematically, and additional details and/or components for operating the LIDAR system 300 would be understood by the person of skill in the art. Elements of the LIDAR system 300 that are similar to those of the LIDAR system 200 retain the same reference numeral and will generally not be described again.

Broadly speaking, the LIDAR system 300 includes a variety of internal components including, but not limited to: (i) the emitter 280, (ii) the beam splitting element (not shown), (iii) a rotatable scanning element 340, (iv) the detector 290 (shown in FIG. 8) and (v) a controller, in this case the electronic device 110. It is contemplated that in addition to the components non-exhaustively listed above, the LIDAR system 300 could include a variety of components (such as, for example, sensors, beam controlling optics, mechanical structures, housing, etc.) which are omitted from the Figures for sake of clarity. In certain non-limiting embodiments of the present technology, one or more of the internal components of the LIDAR system 300 are disposed in a common housing (not shown).

Broadly speaking, the LIDAR system 300 operates as follows: the emitter 280 of the LIDAR system 300 emits pulses of light, forming an output beam (solid arrows in FIG. 8); the rotatable scanning element 340 scans the output beam across the surroundings 150 of the vehicle 120 for locating/capturing data of a priori unknown objects therein, for example, for generating a map of the surroundings 150 where objects are represented in a form of one or more data points. The rotatable scanning element 340 will be described in more detail below.

Once the output beam reaches one or more objects in the surroundings, the object(s) generally reflects at least a portion of light from the output beam, and some of the reflected light beams may return back towards the LIDAR system 300, to be received in the form of an input beam (dotted lines in FIG. 8). It is noted that a portion of the light of the output beam may be absorbed or scattered by objects in the surroundings.

The input beam, when arriving at the LIDAR system 300, is received by the rotatable scanning element 340 and directed thereby to the detector 290. The input beam is then captured and detected by the detector 290. In response, the detector 290 is then configured to generate one or more representative data signals. For example, the detector 290 may generate an output electrical signal (not depicted) that is representative of the input beam. The detector 290 may also provide the so-generated electrical signal to the controller 110 for further processing. Finally, by measuring a time between emitting the output beam and receiving the input beam, the distance(s) to the objects in the surroundings 150 are calculated by the controller 110.

It should be noted that, in various non-limiting embodiments of the present technology, the LIDAR system 300 could include additional optical components. For example, the LIDAR system 300 may include one or more optical components configured to condition, shape, filter, modify, steer, or direct the output beam and/or the input beam. For example, the LIDAR system 300 may include one or more lenses, mirrors, filters (e.g., band pass or interference filters), optical fibers, circulators, beam splitters, polarizers, polarizing beam splitters, wave plates (e.g., half-wave or quarter-wave plates), diffractive elements, microelectromechanical (MEM) elements, collimating elements, or holographic elements.

Generally speaking, the rotatable scanning element 340 steers the output beam in one or more directions downrange towards the surroundings 150 and conversely steers the input beam upon arrival at the LIDAR system 300 to the detector 290. The rotatable scanning element 340 is communicatively coupled to the controller 110. As such, the controller 110 is configured to control the rotatable scanning element 340 so as to guide the output beam in a desired direction downrange and/or along a predetermined scan pattern. Broadly speaking, in the context of the present specification "scan pattern" may refer to a pattern or path along which the output beam is directed by the rotatable scanning element 340 during operation.

With continued reference to FIGS. 7 to 9, the rotatable scanning element 340 will be described in more detail.

The rotatable scanning element 340 is configured for receiving the output light beam and scanning the output beams out of the system 300 by rotating about the axis of rotation 255 of the reflective prism 250. It is contemplated that the rotatable scanning element 340 could be controlled to oscillate in two directions, rather than rotating in a single direction, in some cases. In the present embodiment, the rotatable scanning element 340 includes the reflective prism 250, described above, and a a transmission element 320 fixedly connected to the reflective prism 250. The LIDAR system 300 is configured to perform a peripheral scan using the rotatable scanning element 340. As is illustrated in the present non-limiting example, the LIDAR system 300 is configured for connecting to the self-driving vehicle 120 on a lateral side thereof. It is contemplated, however, that specific placement of the LIDAR system 300 on the vehicle 120 could vary.

The rotatable scanning element 340 further includes the transmission element 320 connected to the reflective prism 250. The transmission element 320 is fixedly coupled to the reflective prism 250, such that both the transmission element 320 and the reflective prism 250 rotate together, in a fixed relative angular position, during operation of the LIDAR system 300. Although not illustrated herein, the fastening system maintaining the relative angular position between the transmission element 320 and the reflective prism 250 is further configured to allow adjustments, by a user, to the relative angular position for calibration of the rotatable scanning element 340.

The transmission element 320 has an exterior edge portion 322 extending around the axis of rotation 255 generally in a plane orthogonal to the axis 255, where the edge portion 322 has a variable thickness about the axis 255. The transmission element 320 is described by at least two planes of symmetry, two of these being illustrated by the lines 8-8 and 9-9, each plane of symmetry transecting the axis of rotation 255. The transmission element 320 has four parallel edge portions 324 where a first surface of the transmission element 320 is substantially parallel to a second surface of the transmission element 320 (see FIG. 8). The parallel edge portions 324 cause a minimum of ray bending of the output beams passing therethrough, with the first and second surfaces being generally perpendicular to the axis of rotation 155. The transmission element 320 also has four wedge portions 326, where at least a portion of the first surface is angled relative to the second surface, forming wedge or generally triangular-shaped prism portions. Output beams refracting through the four wedge portions 326, which are thicker than the parallel portions 324, are thus diverted away from the ray path of output beams transmitted through the one of the parallel portions 324.

The edge 322 of the transmission element 320 alternates between the parallel edge portions 324 and the wedge portions 326 as the transmission element 320 extends around the axis of rotation 255, and thus output beams encounter either one of the portions 324, 326, depending on the position in the rotation during operation. The edge 322 smoothly varies in transitions between a given parallel edge portion 324 and an adjacent angled wedge portion 326, to void abrupt transitions or sharp edges.

As is mentioned above, the transmission element 320 is selectively rotatable relative to the reflective prism 250 such that the angle of incidence of the output beam on the reflective prism 250 is adjustable according to a relative angular orientation between the transmission element 320 and the reflective prism 250. The transmission element 320 is disposed generally between the emitter 280 and the reflective prism 250 along a direction defined by the axis of rotation 255. More specifically, the emitter 280 is arranged to emit the output light beam at an angle skewed relative to the axis of rotation 255 of the rotatable scanning element 340.

According to the present technology, the emitter 280, the detector 290, and the rotatable scanning element 340 are arranged such that the output light beam is incident on and refracted by the transmission element 320 and subsequently incident on one face of the reflective prism 250. The angle of incidence of the output beam on the face depends on the variable thickness of the transmission element 320. In this way, the relative position of the transmission element 320 to the reflective prism 250 determines a ray spread of the output beam across different positions of the rotatable scanning element 340, which in turn determines the regularity, or irregularity, of the point density of the data map determined by the LIDAR system 300. By providing a manner for adjusting of the angles of incidence on the reflective prism 250, provided by the variable thickness of the transmission element 320, distortion of the point cloud over a given field of view can be calibrated.

With reference to FIG. 10, another non-limiting embodiment of a method 310 for adjusting scan distortion of a LIDAR system, specifically the LIDAR system 300 in the present embodiment.

The method 310 includes, at step 314, changing an angular position of the transmission element 320 relative to the reflective prism 250. As is mentioned above, the relative position of the transmission element 320 to the reflective prism 250 determines the ray spread of the output beam emitted by the emitter 280, and more specifically the uniformity thereof. Thus, adjustment of the scan distortion is correlated to adjustment of the ray spread of the output beams, since the relative grouping of output beams (ray spread) is directly related to the angle of incidence of the output beam on the reflective prism 250, which in turn is adjustable using different portions of the transmission element 320.

In some embodiments, the method 310 begins, at step 312, with determining, by the controller 110, a scan distortion of light received during operation of the LIDAR system 300. By measuring, for instance, different sampling densities of output beams across different portions of the field of view, a determination or calibration can be made to adjust the ray spread by adjusting the angle of incidence on the reflective prism 250 by adjusting the positioning of the transmission element 320 relative to the reflective prism 250. In such cases, changing the angular position of the transmission element 320, at step 314, could then be based on the scan distortion determined.

In at least some embodiment, changing the angular position of the transmission element 320 relative to the reflective prism 250 includes positioning the transmission element 320 such that the scan distortion is minimized for at least a portion of rotation of the rotatable scanning element 340 during operation.

It is contemplated that the methods 210, 310 could include additional or different steps, either to perform additional functions and/or to perform the steps described above. Additionally, the steps of the methods 210, 310 could be performed in an assortment of different sequences, depending on for example user preferences, and is not limited to the order set forth in the explanation above.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A LIDAR system comprising:
an emitter configured to emit at least one light beam;
a detector configured for receiving light reflected from surrounding objects; and
a rotatable scanning element configured for receiving the at least one light beam and scanning the at least one light beam out of the system by rotating about an axis of rotation, the rotatable scanning element comprising:
a reflective prism having at least four faces inclined relative to the axis of rotation, and
a ring element fixedly connected to the reflective prism, the ring element having an interior edge face extending around the axis of rotation generally in a plane orthogonal to the axis of rotation, the interior edge face having a variable angle about the axis of rotation, a normal of the interior edge face varying about the axis of rotation from perpendicular to skewed relative to the axis of rotation,
the emitter, the detector, and the rotatable scanning element being arranged such that:
the at least one light beam is incident on the interior edge face of the ring element and subsequently on one face of the at least four faces of the reflective prism, an angle of incidence of the at least one beam on the face depending on the variable angle of the ring element, and
light reflected from surrounding objects being reflected by one of the at least four faces of the reflective prism into the detector.

2. The LIDAR system of claim 1, wherein the ring element is described by at least two planes of symmetry, each plane of symmetry transecting the axis of rotation of the reflective prism.

3. The LIDAR system of claim 1, wherein the interior edge face has:
at least two parallel face zones where at least a portion of the interior edge face is substantially parallel to the axis of rotation; and
at least two angled face zones, where at least another portion of the interior edge face is angled away from the axis of rotation.

4. The LIDAR system of claim 3, wherein:
the interior edge face alternates between the parallel face zones and the angled face zones as the ring element extends around the axis of rotation; and the interior edge face smoothly varies in transitions between a given parallel face zone and an adjacent angled face zone.

5. The LIDAR system of claim 1, wherein the ring element is selectively rotatable relative to the reflective prism such that the angle of incidence of the at least one beam on the reflective prism is adjustable according to a relative angular orientation between the ring element and the reflective prism.

6. The LIDAR system of claim 1, wherein the ring element is disposed generally between the emitter and the reflective prism along a direction defined by the axis of rotation.

7. The LIDAR system of claim 1, wherein the system is configured to perform a peripheral scan.

8. The LIDAR system of claim 7, wherein the system is configured for connecting to a self-driving vehicle on a lateral side thereof.

9. The LIDAR system of claim 1, wherein the reflective prism has a generally pyramidal form.

10. The LIDAR system of claim 1, wherein the at least four faces of the reflective prism are skewed relative to the axis of rotation.

11. The LIDAR system of claim 1, wherein the emitter is arranged to emit the at least one light beam at an angle skewed relative to the axis of rotation of the scanning element.

12. A method for adjusting scan distortion of the LIDAR system of claim 5, the method comprising:

changing the relative angular orientation between the ring element of the rotatable scanning element and the reflective prism of the rotatable scanning element, the relative angular orientation between the ring element and the reflective prism determining the angle of incidence of the at least one light beam emitted by the emitter of the LIDAR system, adjustment of the scan distortion being correlated to adjustment of the angle of incidence of the at least one light beam.

13. The method of claim 12, further comprising:

determining, by a controller of the LIDAR system, a scan distortion of light received during operation of the LIDAR system; and wherein changing the relative angular orientation between the ring element and the reflective prism is based on the scan distortion determined.

14. The method of claim 13, wherein changing the relative angular orientation between the ring element and the reflective prism includes positioning the ring element such that the scan distortion is minimized for at least a portion of rotation of the scanning element during operation.

* * * * *